July 7, 1970   C. E. BOGART   3,518,833
ADJUSTABLE DAM STOCK FOR IRRIGATION DITCH
Filed Nov. 6, 1968
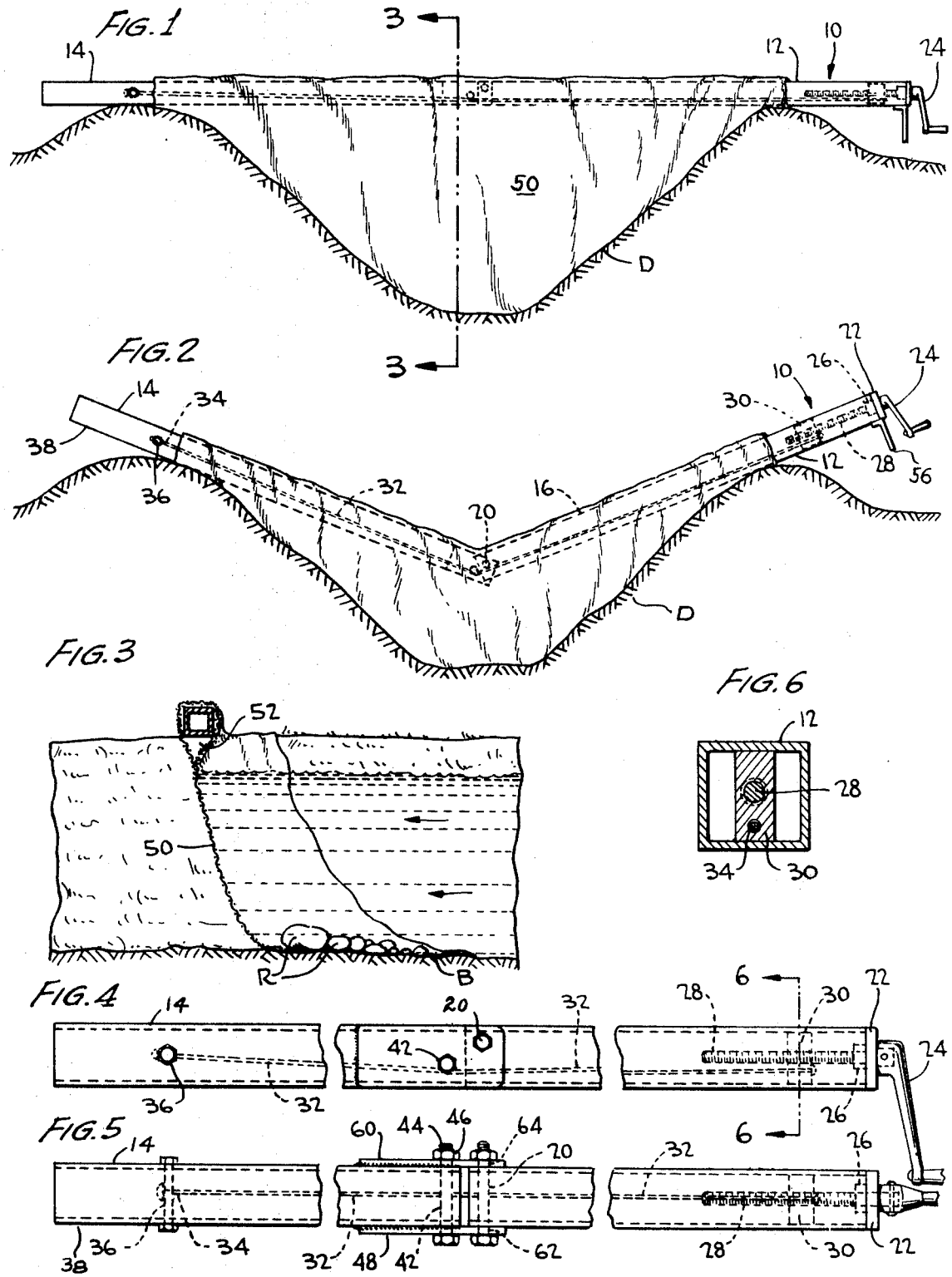
INVENTOR,
C. E. BOGART
BY Jacobi + Davidson
ATTORNEYS United States Patent Office 3,518,833
Patented July 7, 1970

1

3,518,833
ADJUSTABLE DAM STOCK FOR IRRIGATION DITCH
Clark Elmer Bogart, P.O. Box 459,
Hale Center, Tex. 79041
Filed Nov. 6, 1968, Ser. No. 773,902
Int. Cl. E02b 5/08
U.S. Cl. 61—29                              8 Claims

ABSTRACT OF THE DISCLOSURE

A portable dam stock for an irrigation ditch that comprises a sheet of flexible impervious material suspended from a pair of hollow tubular members that are pivotally interconnected at their adjacent ends and rest at their outer ends on the ground adjacent the sides of the ditch. One end of a flexible cable is attached adjacent the outer end of one of the tubular members, passes through a cable guide at the lower inner end of one of the tubular members, and is attached at its other end to a screw and nut arrangement at the outer end of the other tubular member. By adjusting the screw and nut arrangement, the length of the cable can be increased or decreased to vary the angle between the tubular members and thereby the height of the flexible material that forms the dam stock.

Background of the invention

The present invention relates to a device for controlling the flow of water through an irrigation ditch, and more particularly, to a portable dam stock that is positioned across an irrigation ditch and adjustable to selected positions in order to vary the quantity of water that passes over the dam stock.

While adjustable portable dam stocks for irrigation ditches are known, such devices have not been entirely satisfactory since they often require that any adjustment thereof be made from a midpoint in an irrigation ditch or that they be removed entirely from the irrigation ditch for such adjustment. Furthermore, such known devices often require special materials that are not, as a rule, readily available and when available are costly. Usually, such dam stocks are more complex than the dam stocks of the present invention and also more bulky making them difficult to handle. The placing and removal of such portable dam stocks in irrigation ditches, therefore, requires either more than one man or special handling equipment.

Accordingly, taking into consideration the foregoing deficiencies, it is a primary object of the present invention to provide a portable dam stock that is easy to position and reliable in operation.

Another object of the present invention is to provide a portable dam stock for an irrigation ditch that can be supported directly on the ground adjacent the ditch.

Yet another object of the invention is to provide a portable dam stock the height of which can be adjusted from adjacent the sides of an irrigation ditch.

Still another object of the invention is to provide a portable dam stock wherein a flexible dam stock forming sheet is mounted on a support member that includes a pair of pivotally interconnected tubular support arms.

A further object of the present invention is to provide a portable support member for a dam stock forming sheet that comprises a plurality of interconnected, rigid, lightweight, hollow tubular arms that are rectangular in cross-section.

A further additional object of the invention is to provide a portable dam stock according to the teachings of the present invention which is simple in construction, durable and made of materials of relatively low cost.

2

The invention will be better understood, and objects other than those set forth above will become apparent, after reading the following detailed description thereof.

Such description refers to the annexed drawings presenting preferred and illustrative embodiments of the invention.

In the drawings:

FIG. 1 is an elevational view showing the dam stock adjusted to an elevated position in which it precludes flow through an irrigation ditch.

FIG. 2 is an elevational view of the dam stock adjusted to a lowered position in which it permits flow of water through the irrigation ditch.

FIG. 3 is a sectional view of the dam stock taken on the line 3—3 of FIG. 1.

FIG. 4 is a side view of the structure which forms the support for the flexible material that controls the flow of water through the irrigation ditch.

FIG. 5 is a top plan view of the supporting structure illustrated in FIG. 4.

FIG. 6 is a sectional view taken along the line 6—6 of FIG. 4.

Description of the preferred embodiment

Referring to FIGS. 1 and 2, it is to be noted that the flexible material support includes a supporting structure indicated generally by the reference numeral 10. Supporting structure 10 includes a pair of supporting members 12, 14 of any suitable available material. In the form of the invention illustrated in the drawings, the supporting members are disclosed, particularly in FIG. 6, as being square in cross-section. Moreover, supporting members 12 and 14 are shown to be hollow in order to reduce their weight. However, these members may be solid and of any shape in cross-section, for example, they may be rectangular, circular or elliptical.

Supporting members 12 and 14 are interconnected at their adjacent ends 16, 18 by any conventional means such as a hinge bolt 20. A laterally extending support arm 22 is provided at the outer end of supporting member 12 by any suitable means such as welding, if the support arm be made of metal or by bonding, if the support arm be made of any well-known plastic. A handle 24 is mounted on laterally extending support arm 22 by any well-known conventional journal means such as illustrated at 26. An elongated screw 28 extends through journal 26 and is rotated by handle 24. A nut-like element 30 is threadedly mounted on elongated screw 28 and moves toward or away from handle 24 depending on the direction in which handle 24 is rotated. A flexible cable 32 of metal, rope, or other suitable material, is attached at one of its ends 34, by any suitable fastening means 36, mounted between the sides 38 of supporting member 14 and at its opposite end to the nut-like element 30. Flexible cable 32 passes under the central portion 40 of a bolt-like member 42 that extends through support member 14. The opposite end of the bolt-like member 42 extends through support member 14 and is threaded at 44. It has threaded thereon a conventional nut 46. Secured, respectively, against the side 38 of support member 14 and the side of member 14 opposite side 38 is a pair of hinge-bolt supporting plate members 48 and 60. The opposite end of each of the hinge-bolt supporting plate members 48, 60 is, respectively, provided with openings 62, 64. These openings 62, 64 are aligned and receive the hinge-bolt 20 so that the supporting members 12 and 14 may be pivotally moved relative to each other.

FIGS. 1, 2 and 3 illustrate a dam stock member 50 formed of canvas or other suitable flexible material that is folded over at its upper end to provide a longitudinally extending pocket 52. The supporting members 12 and 14 of the supporting structure 10 are arranged to extend through said longitudinally extending pocket 52 and support said canvas stock member 50 throughout its entire length.

When it is desired to place the dam stock into operation, the supporting members 12, 14 with the canvas stock member 50 suspended therefrom are placed across the irrigation ditch D so that the lower end 54 of the canvas stock member 50 rests along the bottom B of the irrigation ditch D. A rock R is then placed upon the lower end 54 of the canvas stock member 50 in order to maintain the lower end 54 of the canvas stock member 50 in a given position along the bottom B of irrigation ditch D. When it is desired to adjust the height of the canvas stock member 50 in the irrigation ditch D, the user grasps the handhold 56 in one hand and rotates the handle 24 in one direction with the other hand to raise the canvas stock member 50 and in the other direction to lower the canvas stock member 50. By adjusting the height of the canvas stock member 50 in the irrigation ditch D by the use of handle 24, it can be readily seen that the amount of water passing over the dam stock can be controlled from the ground adjacent the ditch D.

After reading the foregoing detailed description, it will be apparent that the objects set forth initially have been successfully achieved.

What is claimed is:

1. An adjustable dam stock for irrigation ditches comprising a pair of hollow support members; pivot means interconnecting said support members at adjacent ends thereof; said support member having a total length sufficient to extend transversely across an irrigation ditch; a flexible stock member; means for supporting said flexible stock member upon said support members; a flexible cable; said flexible cable being fastened at one end to the end of one of said support members that is remote from its interconnected end; said cable passing freely through the interior of said one member, through said support members at their interconnected ends, through the interior of said other member and attached at its other end to means within and movable longitudinally relative to the other support member adjacent its end that is remote from its interconnected end; whereby when said longitudinally movable means is moved in a direction toward the interconnected ends of said support members, the flexible stock member is lowered to permit water to flow thereover through the irrigation ditch and when it is raised sufficiently the flow of water through the irrigation ditch is prevented.

2. An adjustable dam stock as defined in claim 1 wherein said longitudinally movable means is slidable in said other support member.

3. An adjustable dam stock as defined in claim 1 wherein said longitudinally movable means comprises a member which is at least partially surrounded by and slidable on said other support member.

4. An adjustable dam stock as defined in claim 3 wherein said other support member and said longitudinally movable means are rectangular in cross-section.

5. An adjustable dam stock as defined in claim 1 wherein said longtiudinally movable means includes a portion having a threaded opening extending therethrough.

6. An adjustable dam stock as defined in claim 1 wherein said longitudinally movable means includes a threaded opening extending therethrough and said other support member has journaled thereon, for non-longitudinal movement, a longitudinally extending screw arranged to cooperate with the threads of said longitudinally movable means.

7. An adjustable dam stock as defined in claim 1 wherein said interconnecting pivot means includes a pair of spaced hinge-bolt supporting means fixed to one of said support members and each has a portion thereof extending longitudinally beyond said one support member; transverse aligned openings in said, respective, longitudinally extending portions and a hinge-bolt extending through said aligned openings.

8. An adjustable dam stock as defined in claim 1 wherein said longitudinally movable means includes a portion that is square in cross-section and slidable in said other support member; said longitudinally movable means further includes a portion having a threaded opening extending therethrough; said other support member has journaled thereon, for non-longitudinal movement, a longitudinally extending handle-rotated screw arranged to cooperate with the threads of said longitudinally movable means; and said interconnecting pivot means includes a pair of spaced hinge-bolt supporting means fixed to one of said support members and each has a portion thereof extending longitudinally beyond said one support member; transverse aligned openings in said, respective, longitudinally extending portions and a hinge-bolt extending through said aligned openings.

References Cited

UNITED STATES PATENTS

| | | | |
|---|---|---|---|
| 1,080,944 | 12/1913 | Baker | 61—29 |
| 1,784,955 | 12/1930 | Ballard | 61—29 |
| 2,654,225 | 10/1953 | Saunders et al. | 61—29 |
| 2,674,855 | 4/1954 | Taylor | 61—29 |
| 3,295,699 | 1/1967 | Bauernschub | 287—99 |
| 3,355,896 | 12/1967 | Price | 61—29 |

PETER M. CAUN, Primary Examiner